United States Patent
Benedict et al.

(10) Patent No.: US 10,254,020 B2
(45) Date of Patent: Apr. 9, 2019

(54) REGENERATOR INCLUDING MAGNETO CALORIC MATERIAL WITH CHANNELS FOR THE FLOW OF HEAT TRANSFER FLUID

(71) Applicant: General Electric Company, Schenectady, NY (US)

(72) Inventors: Michael Alexander Benedict, Louisville, KY (US); David G. Beers, Elizabeth, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 561 days.

(21) Appl. No.: 14/602,336

(22) Filed: Jan. 22, 2015

(65) Prior Publication Data
US 2016/0216012 A1 Jul. 28, 2016

(51) Int. Cl.
F25B 21/00 (2006.01)
F25D 11/00 (2006.01)

(52) U.S. Cl.
CPC ...... *F25B 21/00* (2013.01); *F25B 2321/0021* (2013.01); *F25D 11/00* (2013.01); *Y02B 30/66* (2013.01)

(58) Field of Classification Search
CPC ............ F25B 21/00; F25B 2321/002; F25B 2321/0021; F25B 2321/0022; F25B 2321/0023; Y02B 30/66
USPC .................................................... 62/3.1, 3.3
See application file for complete search history.

(56) References Cited

U.S. PATENT DOCUMENTS

| | | |
|---|---|---|
| 668,560 A | 2/1901 | Fulner et al. |
| 4,107,935 A | 8/1978 | Steyert, Jr. |
| 4,507,927 A | 4/1985 | Barclay |
| 4,549,155 A | 10/1985 | Halbach |
| 4,625,519 A | 12/1986 | Hakuraku et al. |
| 4,642,994 A | 2/1987 | Barclay et al. |
| 5,091,361 A | 2/1992 | Hed |
| 5,156,003 A | 10/1992 | Yoshiro et al. |
| 5,249,424 A | 10/1993 | DeGregoria et al. |

(Continued)

FOREIGN PATENT DOCUMENTS

| | | |
|---|---|---|
| CA | 2893874 A1 | 6/2014 |
| CN | 101979937 | 10/2010 |

(Continued)

OTHER PUBLICATIONS

International Search Report and Written Opinion issued in connection with PCT Application No. PCT/US2014/042485 dated Oct. 31, 2014.

(Continued)

*Primary Examiner* — Joseph F Trpisovsky
(74) *Attorney, Agent, or Firm* — Dority & Manning, P.A.

(57) ABSTRACT

The present invention provides a regenerator having magneto caloric material (MCM) configured with flow channels for the passage of a heat transfer fluid through the MCM. The flow channels are created by positioning elongate elements of the MCM adjacent to each other. The elongate elements provide surface area necessary for heat transfer while the flow channels reduce the pressure drop incurred by the heat transfer fluid as it flows through the regenerator. The elongate elements can also be configured with MCM having different Curie temperatures (e.g., different Curie temperature ranges) in order to accommodate a variety of ambient conditions in which the regenerator may be used.

19 Claims, 11 Drawing Sheets

(56) References Cited

U.S. PATENT DOCUMENTS

| | | |
|---|---|---|
| 5,934,078 A | 8/1999 | Lawton, Jr. et al. |
| 6,332,323 B1 | 12/2001 | Reid et al. |
| 6,446,441 B1 | 9/2002 | Dean |
| 6,588,215 B1 | 7/2003 | Ghoshal |
| 6,668,560 B2 | 12/2003 | Zimm et al. |
| 6,935,121 B2 | 8/2005 | Fang et al. |
| 7,552,592 B2 | 6/2009 | Iwasaki et al. |
| 7,644,588 B2 | 1/2010 | Shin |
| 7,897,898 B2 | 3/2011 | Muller et al. |
| 8,099,964 B2 | 1/2012 | Saito et al. |
| 8,209,988 B2 | 7/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,656,725 B2 | 2/2014 | Muller et al. |
| 8,695,354 B2 | 4/2014 | Heitzler et al. |
| 8,729,718 B2 | 5/2014 | Kuo et al. |
| 8,769,966 B2 | 7/2014 | Heitzler et al. |
| 8,869,541 B2 | 10/2014 | Heitzler et al. |
| 8,935,927 B2 | 1/2015 | Kobayashi et al. |
| 2003/0051774 A1 | 3/2003 | Saito |
| 2004/0093877 A1 | 5/2004 | Wada |
| 2004/0250550 A1 | 12/2004 | Bruck |
| 2009/0158749 A1 | 6/2009 | Sandeman |
| 2010/0071383 A1 | 3/2010 | Zhang |
| 2010/0236258 A1 | 9/2010 | Heitzler et al. |
| 2011/0162388 A1 | 7/2011 | Barve et al. |
| 2011/0173993 A1 | 7/2011 | Muller et al. |
| 2011/0182086 A1 | 7/2011 | Mienko et al. |
| 2011/0192836 A1 | 8/2011 | Muller et al. |
| 2011/0239662 A1 | 10/2011 | Bahl et al. |
| 2011/0308258 A1 | 12/2011 | Smith et al. |
| 2012/0079834 A1 | 4/2012 | Dinesen et al. |
| 2012/0222427 A1 | 9/2012 | Hassen |
| 2012/0267090 A1 | 10/2012 | Kruglick |
| 2012/0272666 A1 | 11/2012 | Watanabe |
| 2012/0285179 A1 | 11/2012 | Morimoto |
| 2013/0019610 A1 | 1/2013 | Zimm et al. |
| 2013/0187077 A1 | 7/2013 | Katter |
| 2013/0192269 A1 | 8/2013 | Wang |
| 2013/0232993 A1 | 9/2013 | Saito et al. |
| 2014/0165595 A1 | 6/2014 | Zimm et al. |
| 2014/0190182 A1 | 7/2014 | Benedict |
| 2014/0216057 A1 | 8/2014 | Oezcan |
| 2014/0290273 A1 | 10/2014 | Benedict et al. |
| 2014/0325996 A1 | 11/2014 | Muller |
| 2015/0027133 A1 | 1/2015 | Benedict |
| 2015/0168030 A1 | 6/2015 | Leonard et al. |

FOREIGN PATENT DOCUMENTS

| | | |
|---|---|---|
| CN | 101979937 | 2/2011 |
| CN | 103090583 A | 5/2013 |
| EP | 2108904 A1 | 10/2009 |
| JP | 2002315243 | 10/2002 |
| JP | 2007147136 | 6/2007 |
| JP | 2007/291437 A | 11/2007 |
| JP | 2007291437 A | 11/2007 |
| JP | 2008051412 | 3/2008 |
| KR | 101100301 B1 | 12/2011 |
| KR | 1238234 B1 | 3/2013 |
| WO | WO 02/12800 | 2/2002 |
| WO | WO 03016794 | 2/2003 |
| WO | WO2004/068512 | 8/2004 |
| WO | WO2007/036729 A1 | 4/2007 |
| WO | WO2009/024412 | 2/2009 |
| WO | WO 2011/034594 A1 | 3/2011 |
| WO | WO2014173787 A1 | 10/2014 |

OTHER PUBLICATIONS

International Search Report and Written Opinion issued in connection with PCT Application No. PCT/US2014/017431 dated May 16, 2014.

International search report issued in connection with PCT/US2013/070518, dated Jan. 30, 2014.

Tetsuji Okamura, Performance of a room-temperature rotary magnet refrigerator, Nov. 28, 2005, Elsevier.

Journal of Alloys and Compounds, copyright 2008 Elsevier B.. V... Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.

Effects of annealing on the magnetic entropy change and exchange bias behavior in melt-spun Ni—Mn—In ribbons, X.Z. Zhao, C.C. Hsieh, et al Science Direct, Scripta Materialia 63 (2010).

PCT International Search Report dated Mar. 6, 2014.

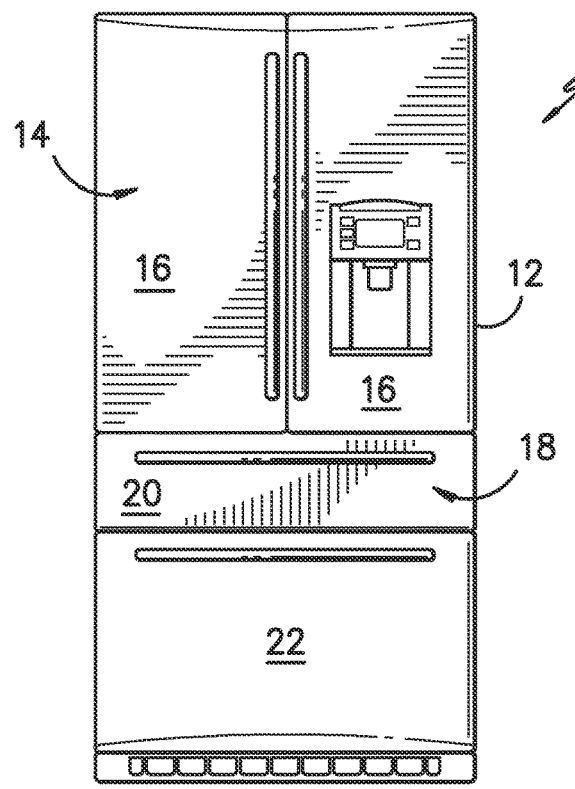
FIG. -1-
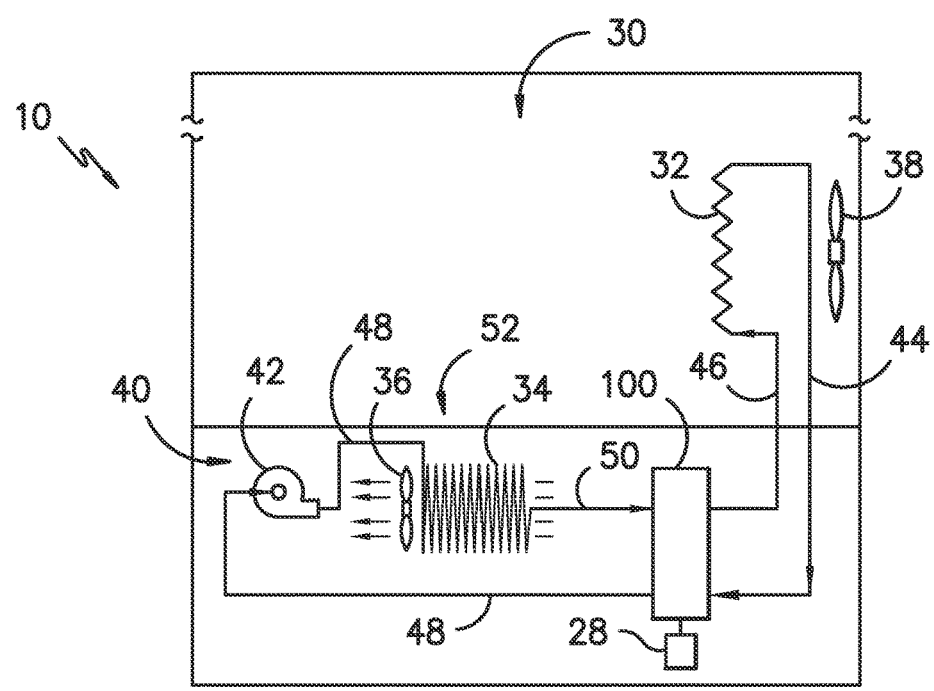
FIG. -2-

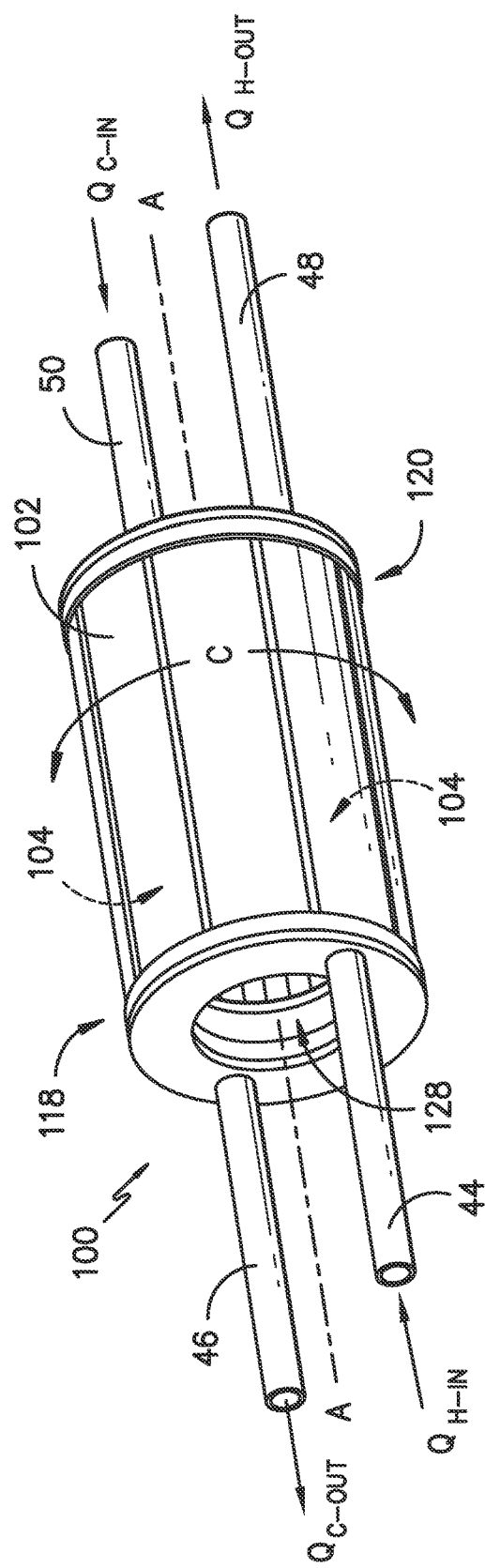
FIG. -3-

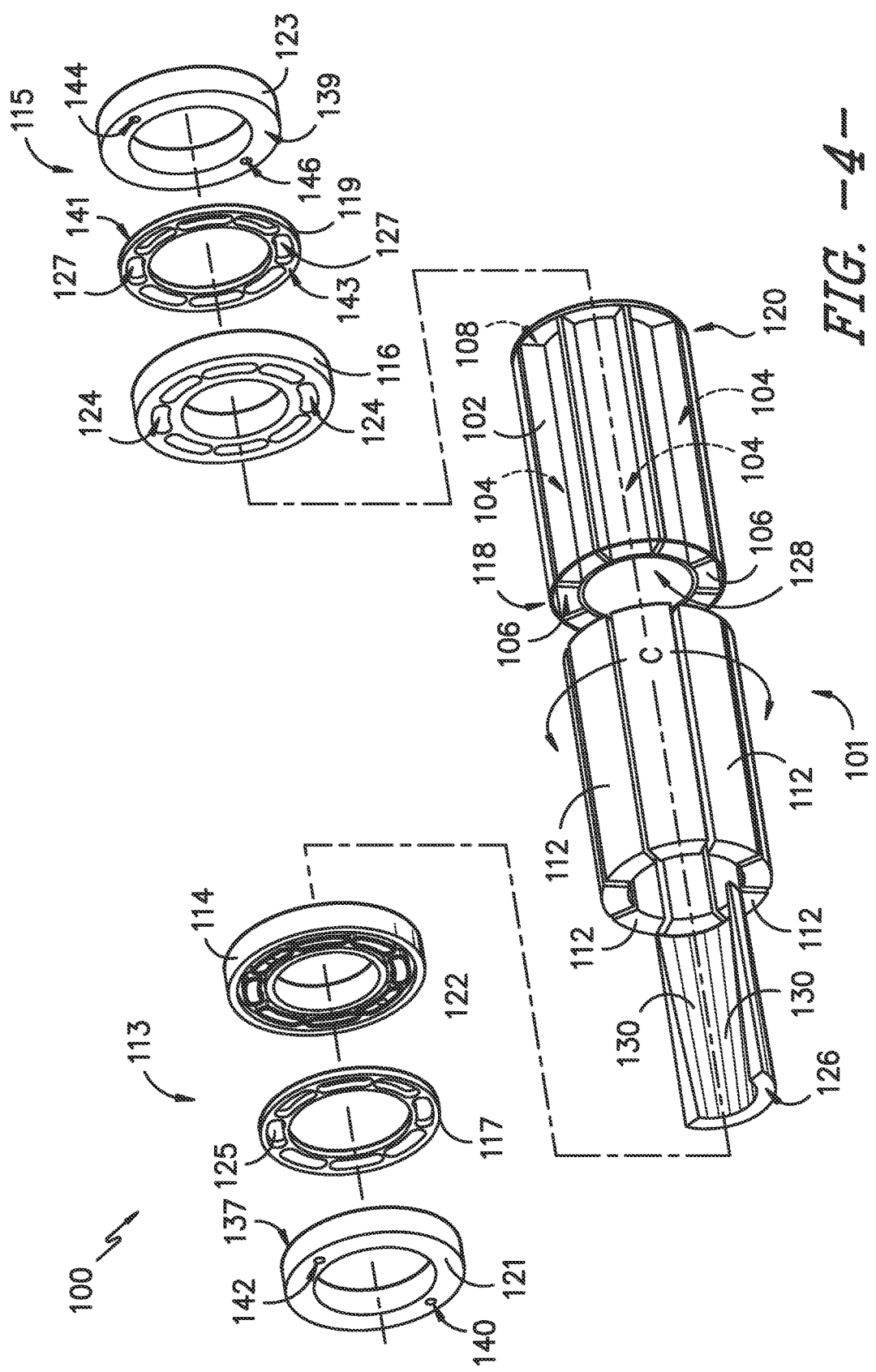
FIG. -4-

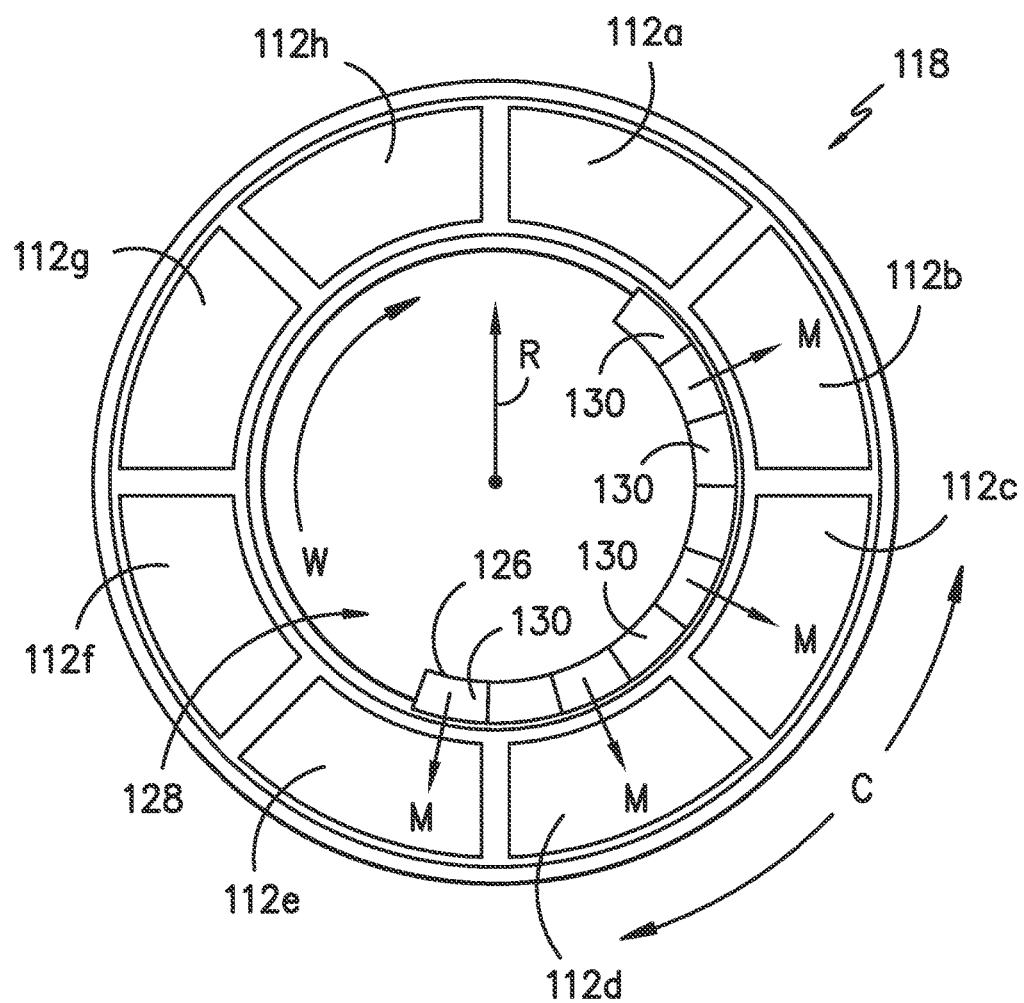
FIG. -5-

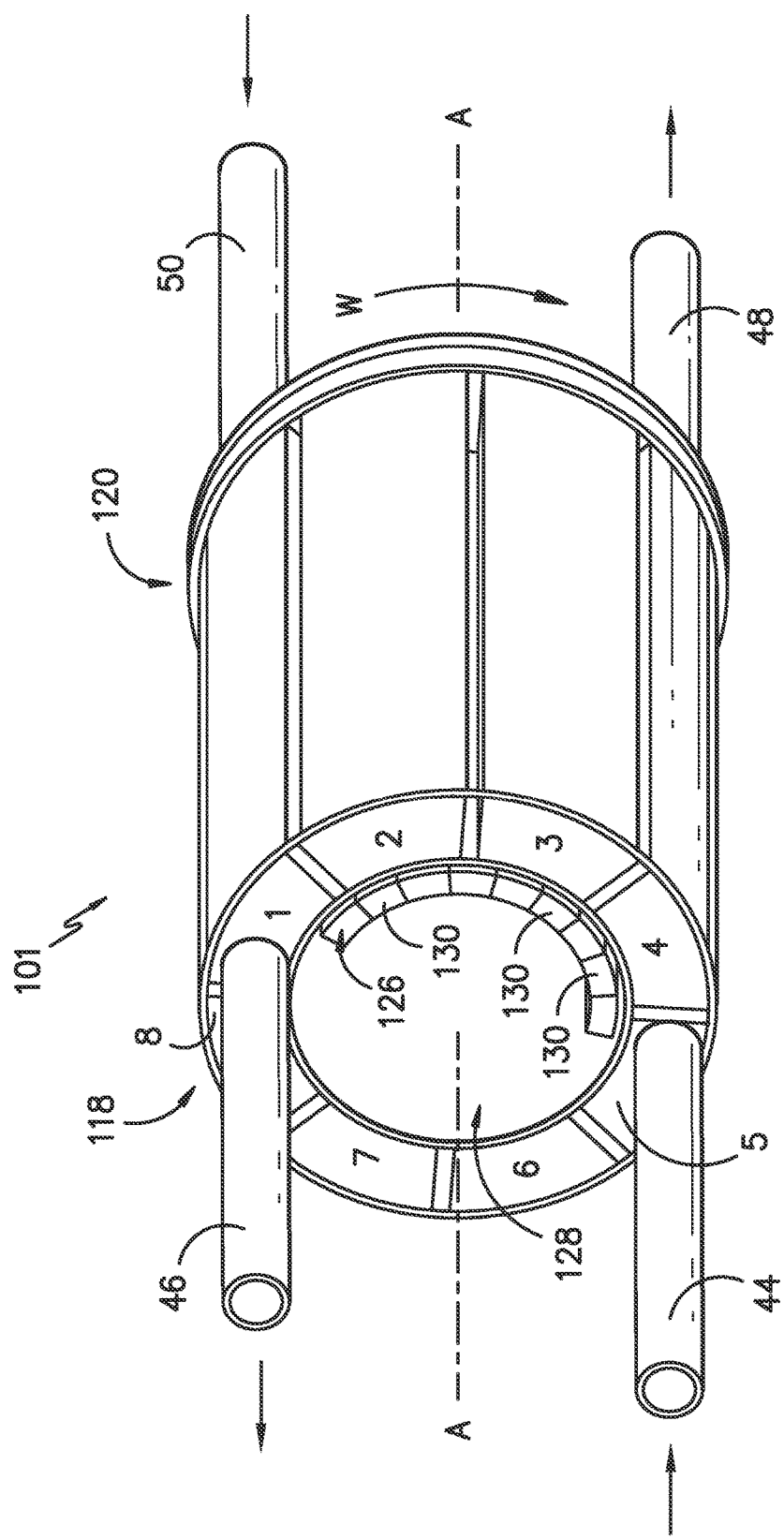
FIG. -6-

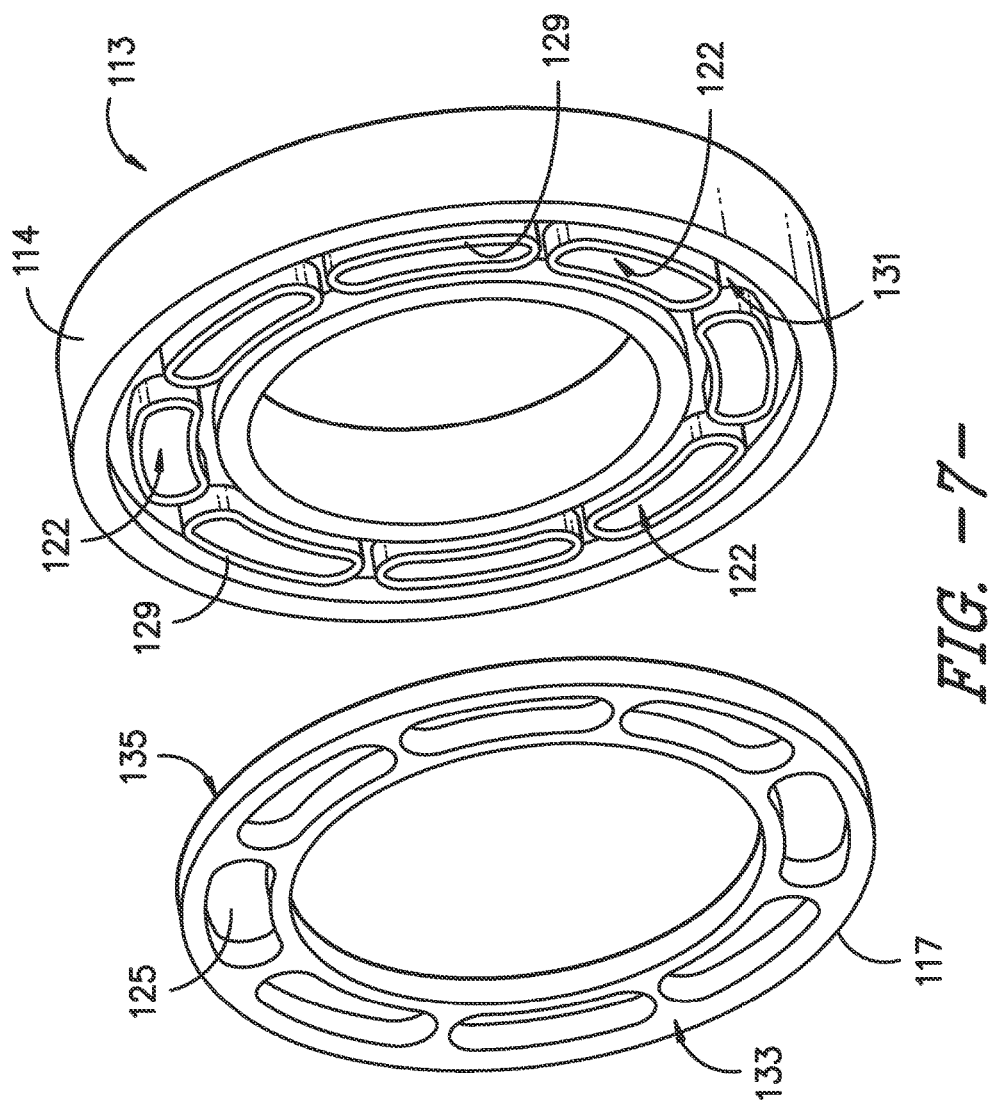
FIG. -7-

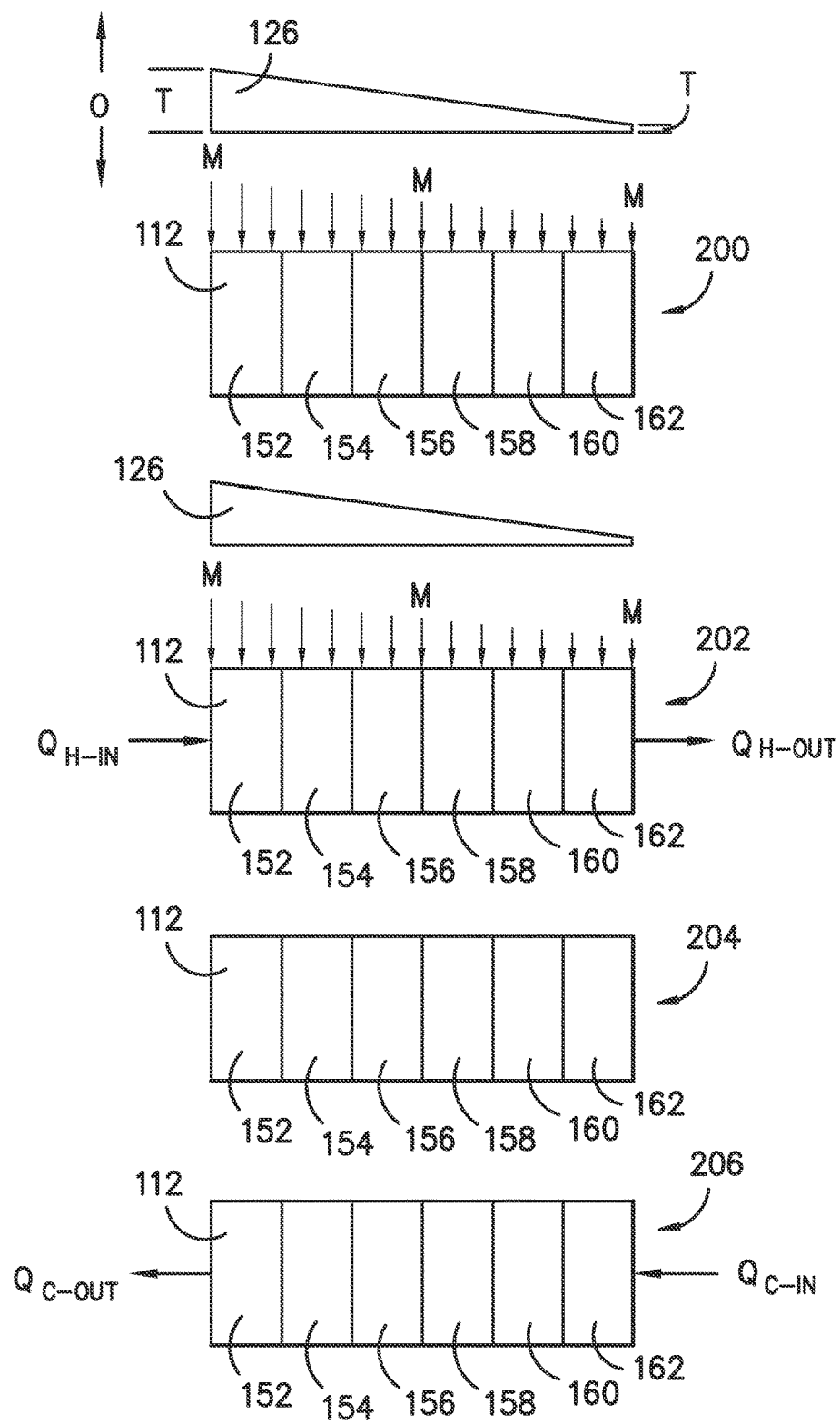
FIG. -8-

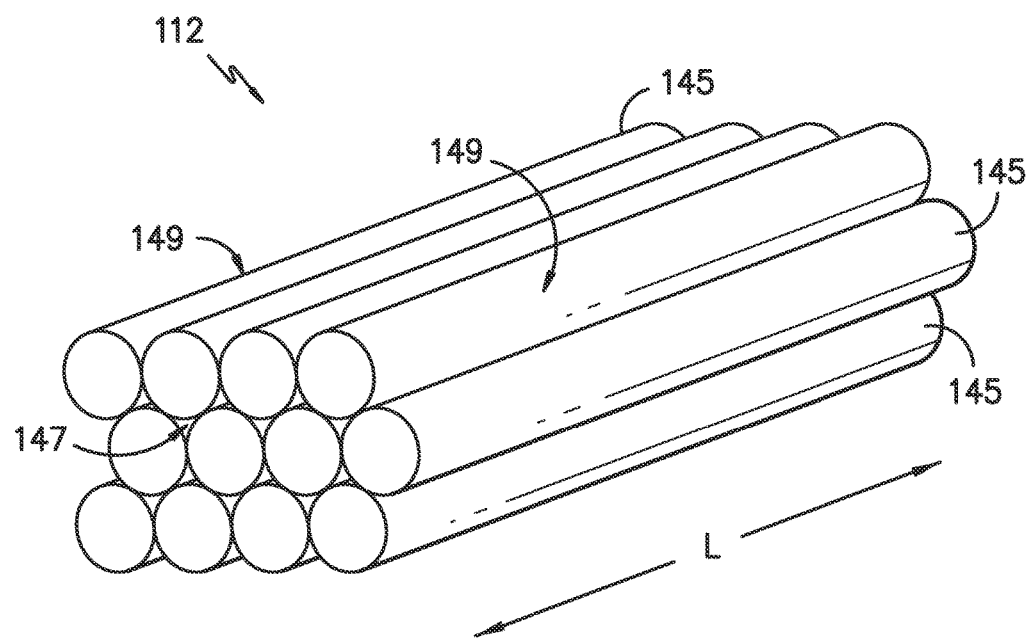
FIG. -9-

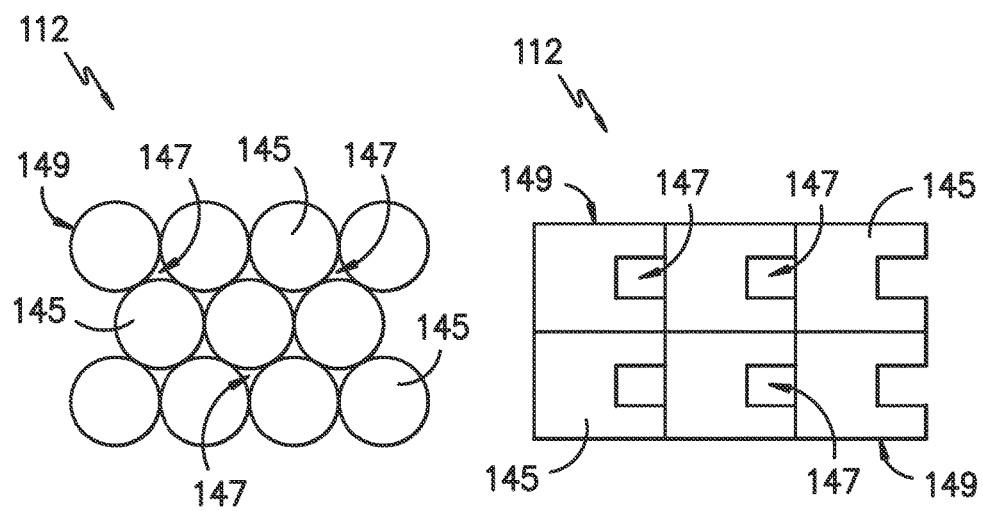
FIG. -10-   FIG. -11-
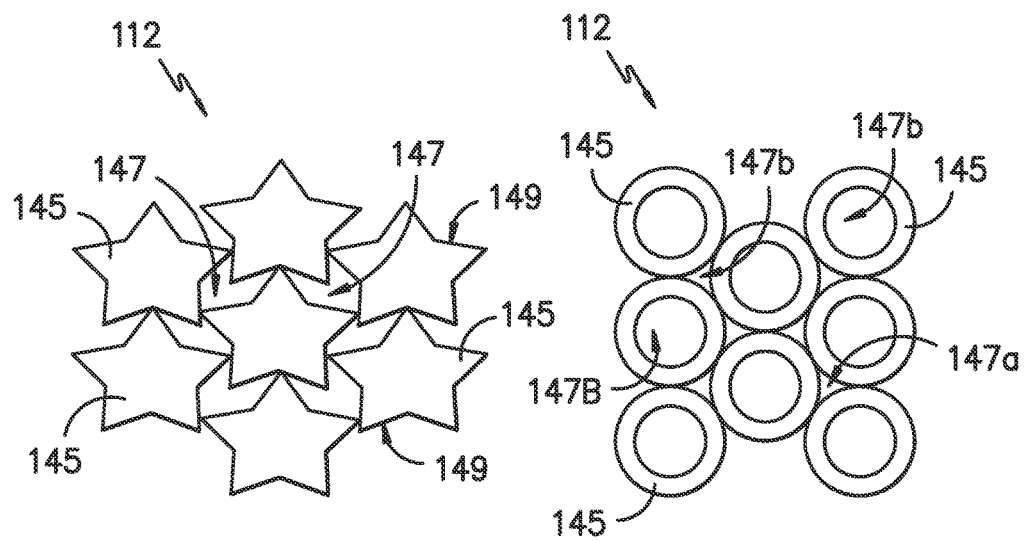
FIG. -12-   FIG. -13-

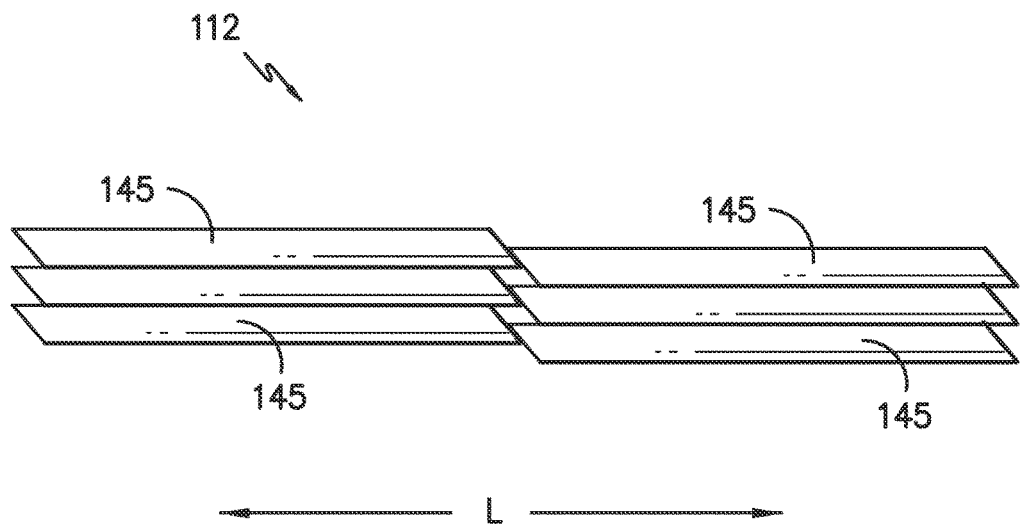
FIG. -14-
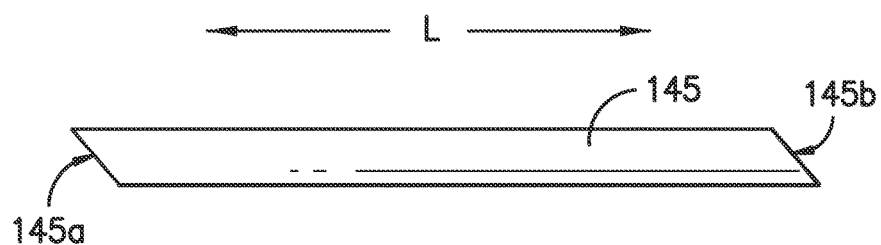
FIG. -15-

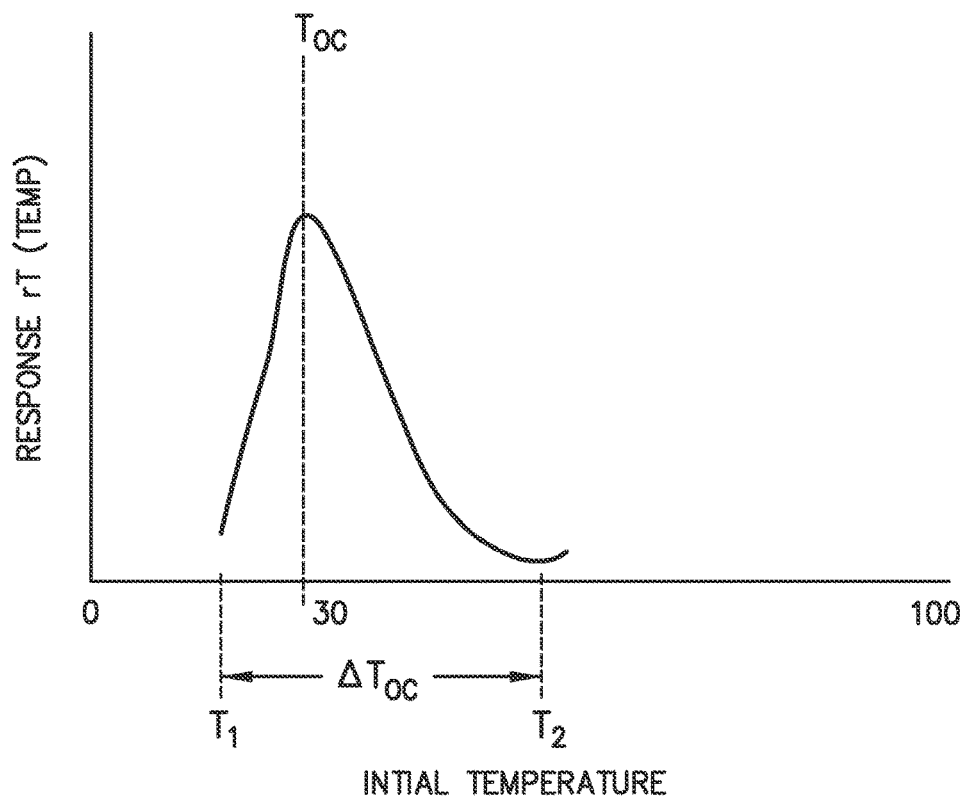
FIG. -16-
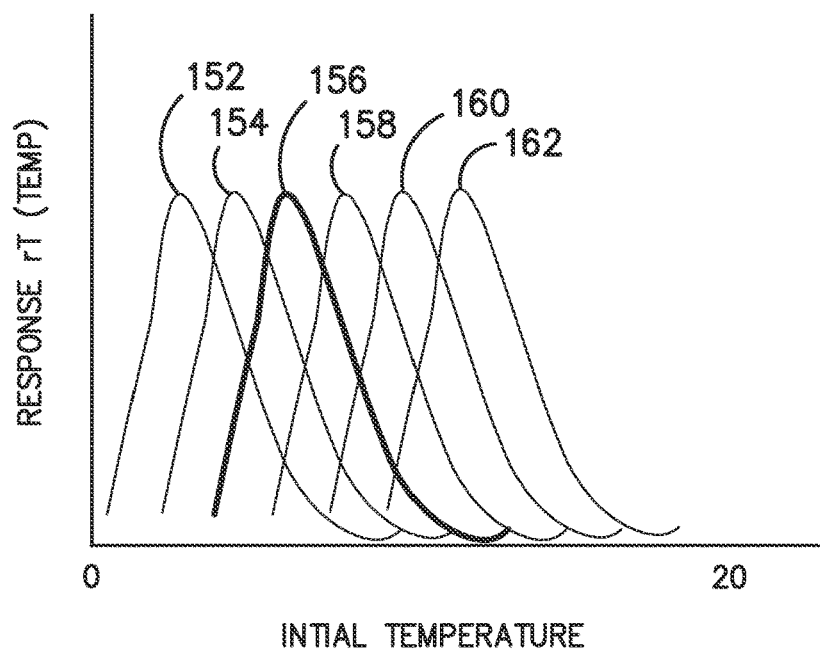
FIG. -17-

REGENERATOR INCLUDING MAGNETO CALORIC MATERIAL WITH CHANNELS FOR THE FLOW OF HEAT TRANSFER FLUID

FIELD OF THE INVENTION

The subject matter of the present disclosure relates generally to a regenerator having magneto caloric material with one or more channels for the flow of heat transfer fluid.

BACKGROUND OF THE INVENTION

Magneto caloric material (MCM)—i.e. a material that exhibits the magneto caloric effect—provides a potential alternative to fluid refrigerants used in e.g., heat pump applications. In general, the magnetic moments of a normal MCM will become more ordered under an increasing, externally applied magnetic field and cause the MCM to generate heat. Conversely, decreasing the externally applied magnetic field will allow the magnetic moments of the MCM to become more disordered and allow the MCM to absorb heat. Some MCM types exhibit the opposite behavior—i.e. generating heat when a magnetic field is removed and becoming cooler when placed into the magnetic field. This latter type can be referred to as inverse or para-magneto caloric material. Both normal and inverse MCM are referred to collectively herein as magneto caloric material or MCM. The theoretical cycle efficiency of a refrigeration cycle based on an MCM and the magnetic caloric effect can be significantly higher than for a comparable refrigeration cycle based on a fluid refrigerant.

Challenges exist to the practical and cost competitive use of an MCM, however. In addition to the development of suitable types of MCM, equipment that can attractively utilize an MCM is still needed. Some MCM-based devices use a regenerator having a construction where a heat transfer fluid flows between parallel plates constructed of MCM. Other regenerators may use beds of MCM particles through which the heat transfer fluid flows to exchange heat. The plate arrangement can provide for a low pressure drop in the flow of the heat transfer fluid through the regenerator but suffers from an overall low surface area for heat transfer. Regenerators using particle beds provide substantial surface area for heat transfer but also incur a substantial pressure drop in the flow of the heat transfer fluid.

Additionally, the ambient conditions under which the MCM-based regenerator may be applied can vary substantially. For example, for a refrigerator appliance placed in a garage or located in a non-air conditioned space, ambient temperatures can range from below freezing to over 90° F. Some types of MCM are capable of accepting and generating heat only within a much narrower temperature range (sometimes referred to as the Curie temperature range) than presented by such ambient conditions. Also, different MCM types may exhibit the magneto caloric effect more prominently at different temperatures.

Accordingly, a regenerating device that can address certain challenges including those identified above would be useful. Particularly, a regenerator that can provide improved pressure drop and surface area for the heat transfer fluid would be useful. A regenerator that can be equipped for use in a wide range of ambient temperature conditions would be also be beneficial. A heat pump or appliance using such a regenerator would also be useful.

BRIEF DESCRIPTION OF THE INVENTION

The present invention provides a regenerator having magneto caloric material (MCM) configured with flow channels for the passage of a heat transfer fluid through the MCM. The flow channels are created by positioning elongate elements of the MCM adjacent to each other. The elongate elements provide surface area necessary for heat transfer while the flow channels reduce the pressure drop incurred by the heat transfer fluid as it flows through the regenerator. The elongate elements can also be configured with MCM having different Curie temperatures (e.g., different Curie temperature ranges) in order to accommodate a variety of ambient conditions in which the regenerator may be used. The present invention also includes a heat pump or appliance incorporating such a regenerator. Additional aspects and advantages of the invention will be set forth in part in the following description, or may be apparent from the description, or may be learned through practice of the invention.

In one exemplary embodiment, the present invention provides a regenerator that includes a working unit extending along a longitudinal direction between a first end of the regenerator and a second end of the regenerator. The working unit includes a plurality of discrete, elongate elements defining a plurality of flow channels extending along the longitudinal direction and configured for the flow of a heat transfer fluid through the flow channels. Each elongate element is constructed from magneto caloric material.

In another exemplary embodiment, the present invention includes a heat pump having a regenerator. The regenerator defines a circumferential direction along which the regenerator is rotatable and extends along an axial direction between a first end and a second end. The regenerator includes a plurality of working units arranged adjacent to each along the circumferential direction and extending along the longitudinal direction between the first end of the regenerator and the second end of the regenerator. Each working unit includes a plurality of discrete, elongate elements defining a plurality of flow channels extending along the longitudinal direction and configured for the flow of a heat transfer fluid therethrough. Each elongate element includes magneto caloric material.

For this embodiment, a magnetic device is positioned proximate to the working units and extends along the longitudinal direction. The magnetic device creates a field of magnetic flux and is positioned so that one or more of the plurality of working units are moved in and out of the magnetic field as the working units are rotated along the circumferential axial direction.

The present invention also includes an appliance, such as e.g., a washing machine, incorporating the exemplary regenerator or heat pump.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides an exemplary embodiment of a refrigerator appliance of the present invention.

FIG. 2 is a schematic illustration of an exemplary heat pump system of the present invention positioned in an exemplary refrigerator with a machinery compartment and at least one refrigerated compartment.

FIG. 3 provides a perspective view of an exemplary heat pump of the present invention.

FIG. 4 is an exploded view of the exemplary heat pump of FIG. 3.

FIG. 5 is a cross-sectional view of the exemplary heat pump of FIG. 3.

FIG. 6 is perspective view of the exemplary heat pump of FIG. 3. Valves located at the ends of a regenerator housing have been removed for purposes of further explanation of this exemplary embodiment of the invention as set forth below.

FIG. 7 is a perspective and exploded view of a plate and seal at one end of the heat pump of FIG. 3.

FIG. 8 is a schematic representation of an exemplary method of operating a heat pump of the present invention.

FIG. 9 is a perspective view of an exemplary elongate element of the present invention forming exemplary flow channels.

FIGS. 10, 11, 12, and 13 are each end views of a plurality of exemplary elongate elements forming working units.

FIG. 14 is a side view of a plurality of exemplary elongate elements placed end to end to form a working unit.

FIG. 15 is a side view of an exemplary elongate element.

FIG. 16 is an exemplary plot of the magneto caloric response for an MCM as a function of temperature.

FIG. 17 is a plot of the magneto caloric response for several staged MCMs as a function of temperature.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an exemplary embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. The drawers 20, 22 are "pull-out" type drawers in that they can be manually moved into and out of the freezer compartment 18 on suitable slide mechanisms.

Refrigerator 10 is provided by way of example only. Other configurations for a refrigerator appliance may be used as well including appliances with only freezer compartments, only chilled compartments, or other combinations thereof different from that shown in FIG. 1. In addition, the regenerator or heat pump system of the present invention is not limited to appliances and may be used in other applications such as e.g., air-conditioning, electronics cooling devices, and others. Thus, it should be understood that while the use of a heat pump to provide cooling within a refrigerator is provided by way of example herein, the present invention may also be used in other applications to provide for heating and/or cooling as well.

FIG. 2 is a schematic view of another exemplary embodiment of a refrigerator appliance 10 including a refrigeration compartment 30 and a machinery compartment 40. In particular, machinery compartment 30 includes an exemplary heat pump system 52 of the present invention having a first heat exchanger 32 positioned in the refrigeration compartment 30 for the removal of heat therefrom. A heat transfer fluid such as e.g., an aqueous solution, flowing within first heat exchanger 32 receives heat from the refrigeration compartment 30 thereby cooling its contents. A fan 38 may be used to provide for a flow of air across first heat exchanger 32 to improve the rate of heat transfer from the refrigeration compartment 30.

The heat transfer fluid flows out of first heat exchanger 32 by line 44 to heat pump 100. As will be further described herein, the heat transfer fluid receives additional heat associated with the magneto caloric effect provided by MCM in heat pump 100 and carries this heat by line 48 to pump 42 and then to second heat exchanger 34. Heat is released to the environment, machinery compartment 40, and/or another location external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52. Motor 28 is in mechanical communication with heat pump 100 as will be further described.

From second heat exchanger 34 the heat transfer fluid returns by line 50 to heat pump 100 where, as will be further described below, due to the magneto caloric effect, the heat transfer fluid loses heat to the MCM in heat pump 100. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of the heat pump system 52 but other heat transfer fluid recirculation loops with different lines and connections may also be employed. Valves can be placed in one or more of lines 44, 46, 48, and 50 to e.g., control flow and may communicate with a controller (now shown) configured for operating heat pump system 52 according to certain exemplary aspects of the present invention. Additionally, pump 42 can also be positioned at other locations or on other lines in system 52. Pump 42 may be e.g., a variable speed pump operated by a controller according to certain exemplary aspects of the present invention. Still other configurations of heat pump system 52 may be used as well. Heat pump system 52 could also be configured with e.g., air-conditioning systems and other applications in addition to a refrigeration appliance.

FIGS. 3, 4, 5, and 6 depict various views of an exemplary heat pump 100 of the present invention. Heat pump 100 includes a regenerator 101 having a regenerator housing 102 and extending along a longitudinal direction between a first end 118 and a second end 120. The longitudinal direction is also parallel to axial direction, denoted by axis A-A, about which regenerator housing 102 rotates during operation. A radial direction R is defined by a radius extending orthogonally from the axis of rotation A-A (FIG. 6). A circumferential direction is indicated by arrows C (FIG. 5), which also denote the direction (clockwise or counter-clockwise) in which regenerator 101 can be rotated during operation.

Regenerator housing 102 defines a plurality of chambers 104 that extend longitudinally along the axial direction defined by axis A-A. Chambers 104 are positioned proximate or adjacent to each other along circumferential direction C. Each chamber 104 includes a pair of openings 106 and 108 positioned at opposing ends 118 and 120 of regenerator housing 102 (FIG. 4).

For this exemplary embodiment, heat pump 100 also includes a plurality of working units 112—which are depicted schematically in FIGS. 4 and 5 and are further described herein. Each working unit 112 contains MCM, is located in one of the chambers 104, and extends along axial direction A-A. For the exemplary embodiment shown in the figures, heat pump 100 includes eight discrete working units 112 positioned adjacent to each other along circumferential direction C as shown and extending longitudinally along the axial direction A-A. As will be understood by one of skill in the art using the teachings disclosed herein, a different number of working units 112 other than eight may be used as well. For example, 2, 4, 6, 12, and other numbers of working units (and associated chambers) may also be used.

As will also be understood using the teachings disclosed herein, the present invention is not limited to a regenerator 101 with a housing 102 having the structure shown in FIG. 4. Instead, other configurations may be used for creating multiple working units 112. For example, regenerator 101 can be provided without a housing 102 having chambers 104 for each working unit 112. In such an embodiment, the working units 112 can be defined by the MCM. For example, the working units 112 could be partitioned along circumferential direction C by multiple spaces dividing the MCM into working units 112 instead of being partitioned by the walls defining chambers 104. In still another embodiment, MCM could be provided having channels, grooves, or other features dividing the MCM along the circumferential direction C into multiple working units 112. Other configurations where regenerator 101 or housing 102 does not include structure such as chambers 104 for partitioning the MCM into the various working units 112 could be used as well.

For this exemplary embodiment of heat pump 100, a pair of valves 113 and 115 are positioned at axial ends of regenerator housing 102 (FIG. 4). Together valves 113 and 115 include a pair of rotatable plates 114 and 116, a pair of fixed plates 121 and 123, and pair of gaskets 117 and 119. As will be further described, gaskets 117 and 119 are configured to provide fluids seals between the pair of rotatable plates 114, 116 and the pair of fixed plates 121, 123, respectively.

First rotatable plate 114 is attached to first end 118 and second rotatable plate 116 is attached to second end 120. As shown in FIG. 4 and FIG. 7 (only rotatable plate 114 is shown in FIG. 7—plate 116 would be substantially identical in construction), each rotatable plate 114 and 116 includes a plurality of apertures 122 and 124, respectively. For this exemplary embodiment, apertures 122 and 124 are configured as circumferentially-extending slots that are spaced apart along circumferential direction C.

Using rotatable plate 114 by way of example, gasket 117 is received into a recess 131 defined by plate 114. A plurality of projections 129 extend from plate 114 along axial direction A towards fixed plate 121 and define apertures 122. Gasket 117 defines a plurality of channels 125 in which projections 129 are received. As such, channels 125 and projections 129 help secure the position of gasket 117 relative to rotatable plate 114 by preventing gasket 117 from rotating relative to plate 114 during operation of the heat pump. For this exemplary embodiment, the opposing faces 133 and 135 of gasket 117 contact fixed plate 121 and rotatable plate 114, respectively, to form a fluid tight seal therebetween. During operation, as regenerator housing 102 rotates about axis A-A, gasket 117 rotates with rotatable plate 114 and also slides over the inside face 137 (FIG. 4) of fixed plate 121 while maintaining the fluid seal. A similar construction and operation is used for fixed plate 123 with inside face 139, gasket 119 with opposing faces 141 and 143, and rotatable plate 116. The plurality of apertures 122 and 124 of the first and second rotatable plates 114 and 116 are aligned with the plurality of apertures 125 and 127 of the pair of gaskets 117 and 119 so as to provide fluid communication therebetween.

A variety of constructions may be used for gaskets 117 and 119. For example, gaskets 117,119 could be constructed from a homogenous material or could be constructed from layers and/or segments of different materials. Gaskets 117, 119 could be a unitary part as shown or could be formed from multiple parts. Also, gaskets 117 and 119 could be formed from one or more materials deposited, adhered, or layered onto e.g., plates 114,116. For example, gaskets 117 and 119 could be formed as coatings on plates 114, 116. Gaskets 117 and 119 could be formed from elastomeric or other pliable materials. Other constructions may be used as well.

Each aperture 122 is positioned adjacent to a respective opening 106 of a chamber 104. Each aperture 124 is positioned adjacent to a respective opening 108 of a chamber 104. Accordingly, a heat transfer fluid may flow into a chamber 104 through a respective aperture 122 and opening 106 so as to flow through the MCM in a respective working unit 112 and then exit through opening 108 and aperture 124. A reverse path can be used for flow of the heat transfer fluid in the opposite direction through the working unit 112 of a given chamber 104.

Referring to FIG. 4, first fixed plate 121 has a first inlet port 140 and a first outlet port 142 and is positioned adjacent to rotatable plate 114. As shown, ports 140 and 142 are positioned 180 degrees apart about the circumferential direction C of first seal 114. However, other configurations may be used. For example, ports 140 and 142 may be positioned within a range of about 170 degrees to about 190 degrees about the circumferential direction C as well. Rotatable plate 114 and regenerator housing 102 are rotatable relative to first fixed plate 121. Ports 140 and 142 are connected with lines 44 and 46 (FIG. 1), respectively. As such, the rotation of regenerator housing 102 about axis A-A sequentially places lines 44 and 46 in fluid communication with at least two working units 112 of MCM at any one time as will be further described.

Second fixed plate 123 has a second inlet port 144 and a second outlet port 146 and is positioned adjacent to second rotatable plate 116. As shown, ports 144 and 146 are positioned 180 degrees apart about the circumferential direction C of second seal 116. However, other configurations may be used. For example, ports 144 and 146 may be positioned within a range of about 170 degrees to about 190 degrees about the circumferential direction C as well. Second rotatable plate 116 and regenerator housing 102 are rotatable relative to second fixed plate 123. Ports 144 and 146 are connected with lines 50 and 48 (FIG. 1), respectively. As such, the rotation of regenerator housing 102 about axis A-A sequentially places lines 48 and 50 in fluid communication with at least two working units 112 of MCM at any one time as will be further described. Notably, at any one time during rotation of regenerator housing 102, lines 46 and 50 will each be in fluid communication with at least one working unit 112 while lines 44 and 48 will also be in fluid communication with at least one other working unit 112 located about 180 degrees away along the circumferential direction.

As shown in FIGS. 4, 5, and 6, regenerator 101 includes a cavity 128 that is positioned radially inward of the plurality of chambers 104 and extends along the longitudinal or axial direction A between first end 118 and second end 120. A magnetic device 126 is positioned within cavity 128 and, for this exemplary embodiment, extends along the axial direction between first end 118 and second end 120. Magnetic device 126 provides a magnetic field M that is directed radially outward as indicated by arrows M in FIG. 5.

The positioning and configuration of magnetic device 126 is such that only a subset (e.g., one, two, or more) of the plurality of working units 112 is/are within or subjected to magnetic field M at any one time. For example, as shown in FIG. 5, working units 112a and 112e are partially within the magnetic field while units 112b, 112c, and 112d are fully within the magnetic field M created by magnetic device 126. Conversely, the magnetic device 126 is configured and positioned so that working units 112f, 112g, and 112h are completely or substantially out of the magnetic field created by magnetic device 126. However, as regenerator housing 102 is continuously rotated along circumferential direction C as shown by arrow W, the subset of working units 112 within the magnetic field will continuously change as some working units 112 will enter magnetic field M and others will exit.

FIG. 8 illustrates an exemplary method of the present invention using a schematic representation of a working unit 112 of MCM in regenerator housing 102 as it rotates in the direction of arrow W between positions 1 through 8 as shown in FIG. 6. During step 200, working unit 112 is fully within magnetic field M, which causes the magnetic moments of the material to orient and the MCM to heat (when a normal MCM is used) as part of the magneto caloric effect. Ordering of the magnetic field is created and maintained as working unit 112 is rotated sequentially through positions 2, 3, and then 4 (FIG. 6) as regenerator housing 102 is rotated in the direction of arrow W. During the time at positions 2, 3, and 4, the heat transfer fluid dwells in the MCM of working unit 112 and, therefore, is heated. More specifically, the heat transfer fluid does not flow through working unit 112 because the openings 106, 108, 122, and 124 corresponding to working unit 112 in positions 2, 3, and 4 are not aligned with any of the ports 140, 142, 144, or 146.

In step 202, as regenerator housing 102 continues to rotate in the direction of arrow W, working unit 112 will eventually reach position 5. As shown in FIGS. 3 and 6, at position 5 the heat transfer fluid can flow through the MCM as first inlet port 140 is now aligned with an opening 122 in first valve 114 and an opening 106 at the first end 118 of working unit 112 while second outlet port 146 is aligned with an opening 124 in second valve 116 at the second end 120 of working unit 112.

As indicated by arrow $Q_{H\text{-}OUT}$ in FIGS. 3 and 8, heat transfer fluid in working unit 112, now heated by the MCM, can travel out of regenerator housing 102 and along line 48 to the second heat exchanger 34. At the same time, and as indicated by arrow $Q_{H\text{-}IN}$, heat transfer fluid from first heat exchanger 32 flows into working unit 112 from line 44 when working unit 112 is at position 5. Because heat transfer fluid from the first heat exchanger 32 is relatively cooler than the MCM in working unit 112, the MCM will lose heat to the heat transfer fluid.

Referring again to FIG. 8 and step 204, as regenerator housing 102 continues to rotate in the direction of arrow W, working unit 112 is moved sequentially through positions 6, 7, and 8 where working unit 112 is completely or substantially out of magnetic field M. The absence or lessening of the magnetic field is such that the magnetic moments of the MCM become disordered and the MCM absorbs heat as part of the magneto caloric effect for a normal MCM. During the time in positions 6, 7, and 8, the heat transfer fluid dwells in the MCM of working unit 112 and, therefore, is cooled by losing heat to the MCM as the magnetic moments disorder. More specifically, the heat transfer fluid does not flow through working unit 112 because the openings 106, 108, 122, and 124 corresponding to working unit 112 when in positions 6, 7, and 8 are not aligned with any of the ports 140, 142, 144, or 146.

Referring to step 206 of FIG. 8, as regenerator housing 102 continues to rotate in the direction of arrow W, working unit 112 will eventually reach position 1. As shown in FIGS. 3 and 6, at position 1 the heat transfer fluid in working unit 112 can flow through the MCM as second inlet port 144 is now aligned with an opening 124 in second valve 116 and an opening 108 at the second end 120 while first outlet port 142 is aligned with an opening 122 in first valve 114 and opening 106 at first end 118. As indicated by arrow $Q_{C\text{-}OUT}$ in FIGS. 3 and 7, heat transfer fluid in working unit 112, now cooled by the MCM, can travel out of regenerator housing 102 and along line 46 to the first heat exchanger 32. At the same time, and as indicated by arrow $Q_{C\text{-}IN}$, heat transfer fluid from second heat exchanger 34 flows into working unit 112 from line 50 when working unit 112 is at position 5. Because heat transfer fluid from the second heat exchanger 34 is relatively warmer than the MCM in working unit 112 at position 5, the MCM will lose some of its heat to the heat transfer fluid. The heat transfer fluid now travels along line 46 to the first heat exchanger 32 to receive heat and cool the refrigeration compartment 30.

As regenerator housing 102 is rotated continuously, the above described process of placing each working unit 112 in and out of magnetic field M is repeated. Additionally, the size of magnetic field M and regenerator housing 102 are such that a subset of the plurality of working units 112 is within the magnetic field at any given time during rotation. Similarly, a subset of the plurality of working units 112 are outside (or substantially outside) of the magnetic field at any given time during rotation. At any given time, there are at least two working units 112 through which the heat transfer fluid is flowing while the other working units 112 remain in a dwell mode. More specifically, while one working unit 112 is losing heat through the flow of heat transfer fluid at position 5, another working unit 112 is receiving heat from the flowing heat transfer fluid at position 1, while all remaining working units 112 are in dwell mode. As such, the system can be operated continuously to provide a continuous recirculation of heat transfer fluid in heat pump system 52 as working units 112 are each sequentially rotated through positions 1 through 8.

As will be understood by one of skill in the art using the teachings disclosed herein, the number of working units for housing 102, the number of ports in valve 114 and 116, and/or other parameters can be varied to provide different configurations of heat pump 100 while still providing for continuous operation. For example, each valve could be provided within two inlet ports and two outlet ports so that heat transfer fluid flows through at least four working units 112 at any particular point in time. Alternatively, regenerator 101—including housing 102, valves 122 and 124, and/or seals 136 and 138—could be constructed so that e.g., at least two working units are in fluid communication with an inlet port and outlet port at any one time. Other configurations may be used as well.

FIG. 9 provides a perspective view of an exemplary working unit 112 of the present invention. Each working unit 112 is constructed from MCM and includes a plurality of discrete, elongate elements 145 that extend along longitudinal direction L, which is oriented parallel to the axis of rotation A-A of regenerator 100. As shown in FIGS. 9 and 10, the cross-sectional shape of elongate elements 145 creates a plurality of small flow channels 147 when elongate elements 145 are stacked or positioned adjacent, and in contact with, each other.

Flow channels 147 also extend along longitudinal direction L and allow for the flow therethrough of the heat transfer fluid used with heat pump 100 in e.g., heat pump system 52. Flow channels 147 experience less pressure drop that e.g., packed beds of MCM. At the same time, the outer surfaces 149 of elongate elements 145 provide sufficient surface area for heat transfer with the MCM of each elongate element 145.

While FIGS. 9 and 10 depict a circular shape, a variety of different cross-sectional shapes may be used for elongate elements 145. For example, FIG. 11 illustrates elongate elements 145 having a cross-sectional C shape that creates flow channels 147 having a rectangular cross-sectional shape. The elongate elements 145 of FIG. 12 have a cross-sectional star shape that creates polygonal flow channels 147. The exemplary elongate elements 145 of FIG. 13 are tubular. Accordingly, interstitial flow channels 147a are positioned between the elongate elements while channels 147b are defined within each elongate element 145. Other configurations and shapes may be used as well to provide surface area for heat exchange with the MCM of the elongate elements 145 while simultaneously reducing the amount of pressure drop as the heat transfer fluid flows through channels 147 along longitudinal direction L.

As shown in FIG. 14, elongate elements 145 may be positioned end-to-end along longitudinal direction L in order to create a working unit 112. In order to ensure that flow channels 147 are not blocked, the ends 145a and 145b can be beveled or provided with a surface at a non-orthogonal angle to longitudinal direction L as shown in FIGS. 14 and 15. As such, the flow of heat transfer fluid through flow channels 147 is not obstructed by the end of an elongate element 145. The positioning of elongate elements 145 end-to-end using MCM with different Curie temperatures can be used to provide stages along a working unit 112 as further described below.

FIG. 16 provides an exemplary plot of a single stage of MCM showing the magneto caloric effect (i.e. a change in temperature, rT, in response to an applied magnetic field of sufficient strength) versus the initial temperature of the MCM (i.e. the temperature of the MCM upon initial application of the magnetic field). As used herein, the Curie temperature of an MCM refers to a temperature at which the MCM undergoes the magneto caloric effect due to changes in a magnetic field (e.g., applying or removing the magnetic field). For most MCMs, however, the magneto caloric effect is not exhibited at single, precise temperature and, instead, occurs over a range. Thus, as also used herein, the original peak Curie temperature, or $T_{OC}$, represents the original initial temperature (before degradation) at which the MCM shows its peak or highest temperature change in response to a magnetic field. As used herein, the original Curie temperature range, or $\Delta T_{OC}$, represents the original range of temperatures (before degradation) over which this MCM exhibits a temperature change in response to the magnetic field. By definition, the original Curie temperature range $\Delta T_{OC}$ includes the original peak Curie temperature $T_{OC}$.

Appliance 10 and/or heat pump system 52 may be used in an application where the ambient temperature changes over a substantial temperature range. However, as indicated in FIG. 16, a specific stage of MCM may exhibit the magneto caloric effect over only a much narrower temperature range $\Delta T_{OC}$. As such, it may be desirable to use multiple stages constructed from a variety of MCMs, each having a different original Curie temperature range $\Delta T_{OC}$, in order to accommodate such ambient temperature changes and to provide the desired temperature to which e.g., cooling or heating is desired. As such, a given working unit 112 might have multiple stages of MCM along the axial direction A to accommodate the wide range of ambient temperatures over which appliance 10 and/or heat pump 100 may be used.

For example, referring now to FIGS. 8 and 17, each working unit 112 can be provided with stages 152, 154, 156, 158, 160, and 162 of different MCMs. These stages are positioned adjacent to each other and are arranged sequentially along a predetermined direction—e.g., along axial direction A-A in this exemplary embodiment. Each such stage includes an MCM that exhibits the magneto caloric effect (before any degradation) at a different original peak Curie temperature $T_{OC}$ or different original Curie temperature range $\Delta T_{OC}$ than an adjacent stage along the axial direction A-A. Various numbers of stages may be used—the use of six in the figures is by way of example only.

As shown in FIG. 17, the stages can be arranged so that e.g., the original Curie temperature ranges $\Delta T_{OC}$ of the plurality of stages increases or decreases along a predetermined direction such as longitudinal or axial direction A-A. For example, stage 152 may exhibit the magnet caloric effect at original Curie temperature range $\Delta T_{OC}$ that is less than the original Curie temperature range $\Delta T_{OC}$ at which stage 154 exhibits the magnet caloric effect, which may be less than the original Curie temperature range $\Delta T_{OC}$ for stage 156, and so on. Other configurations may be used as well. By configuring the appropriate number and sequence of stages of MCM, heat pump 100 can be operated over a substantial range of ambient temperatures to reach the temperature desired for heating cooling.

In one exemplary embodiment, the original Curie temperature ranges $\Delta T_{OC}$ of stages 152, 154, 156, 158, 160, and 162 are also selected to overlap in order to facilitate heat transfer. For example, in the embodiment shown in FIGS. 8 and 15, stage 162 could have a Curie temperature range $\Delta T_{OC}$ of 20° C. to 10° C.; stage 160 could have a Curie temperature range $\Delta T_{OC}$ of 17.5° C. to 7.5° C.; stage 158 could have a Curie temperature range $\Delta T_{OC}$ of 15° C. to 5° C.; stage 156 could have a Curie temperature range $\Delta T_{OC}$ of 12.5° C. to 2.5° C.; stage 154 could have a Curie temperature range $\Delta T_{OC}$ of 10° C. to 0° C.; and stage 152 could have a Curie temperature range $\Delta T_{OC}$ of 5° C. to −2. These ranges are provided as examples. In still another embodiment of the invention, elongate elements 145 can be constructed from MCM having a Curie temperature that increases or decreases continually over its length along longitudinal direction L. For example, each elongate element can be constructed such that the Curie temperature decreases or increases in a linear manner from end to end along longitudinal direction L. Other configurations may be used as well.

During operation of a heat pump 100 having stages 152, 154, 156, 158, 160, and 162 as shown in FIG. 8, the stages having a higher Curie temperature range become less important as e.g., cooling takes place and the compartments of the refrigerator approach 0° C. As the temperature is lowered, the stages having lower Curie temperature ranges (e.g., stages 152 and 154) provide the cooling required to maintain the desired temperature. However, because the stages having a higher Curie temperature range (e.g., 160 and 162) are still being subjected to the field of changing magnetic flux provided by magnetic device 126 as previously described, heat pump 100 is still consuming the power needed to cycle these stages.

Accordingly, as shown in FIG. 8, magnetic device 126 is positioned adjacent to the plurality of stages 152, 154, 156, 158, 160, and 162 and is configured to subject those stages to a magnetic field M of decreasing flux along a predetermined direction, which for this example is along axial direction A-A. As shown by arrows M in FIG. 8, the magnetic flux decreases as the Curie temperature range associated with each stage 152 through 162 increases. For this exemplary embodiment, magnetic device 126 can be constructed from one or more magnets. Magnet(s) 126 have a thickness T along a direction O that is orthogonal to the predetermined direction—i.e. axial direction A-A. Moving along axial direction A-A, the thickness T of magnet(s) 126 decreases so that the corresponding magnetic flux is also decreased along axial direction A.

Other constructions can also be used to provide for a decrease in magnetic flux. For example, magnetic device 126 may be configured as an electromagnet or a combination of an electromagnet and one or more magnets—each of which can be configured to decrease the magnetic flux along a predetermined direction.

A variety of configurations can be used to determine the amount or, more particularly, the rate of decrease in the magnetic flux provided by magnetic device 126 along the predetermined direction. For example, in one exemplary embodiment as shown in FIG. 8, the decrease is substantially linear along axial direction A. The rate or slope of this decrease can be matched to the rate of decrease in the Curie temperature over length of the working units 112. Equation 1 below provides an example:

$$\text{Rate of decrease} = (\Delta T/\text{stage } 152) - (\Delta T/\text{stage } 162)/(\Delta T/\text{stage } 152) \quad \text{Eqn 1:}$$

Other methods may be used for calculating the rate of decrease as well. In addition, the rate of decrease can also include e.g., a non-linear rate of decrease.

By decreasing the magnetic flux provided by magnetic element 126 as described above, the amount of work associated with cycling working units 112 through the magnetic field can be decreased—resulting in more efficiency in the operation of heat pump 100. In addition, where magnetic element 126 is constructed from one or more magnets, the cost of manufacturing heat pump 100 and, therefore, appliance 10 can be substantially reduced.

Returning to FIGS. 4, 5, and 6, for this exemplary embodiment, magnetic element 126 is constructed in the shape of an arc from a plurality of magnets 130 arranged in a Halbach array. More specifically, magnets 130 are arranged so that magnetic device 126 provides a magnetic field M located radially outward of magnetic device 126 and towards regenerator housing 102 while minimal or no magnetic field is located radially-inward towards the axis of rotation A-A. Magnetic field M may be aligned in a curve or arc shape. In addition, the thickness T of magnetic element 126 decreases along a predetermined direction—axial direction A-A in this example—as also shown in FIG. 4.

A variety of other configurations may be used as well for magnetic device 126 and/or its resulting magnetic field. For example, magnetic device 126 could be constructed from a first plurality of magnets positioned in cavity 128 in a Halbach array that directs the field outwardly while a second plurality of magnets is positioned radially outward of regenerator housing 102 and arranged to provide a magnetic field that is located radially inward to the regenerator housing 102. In still another embodiment, magnetic device 128 could be constructed from a plurality of magnets positioned radially outward of regenerator housing 102 and arranged to provide a magnetic field that is located radially inward towards the regenerator housing 102. Other configurations of magnetic device 128 may be provided as well. For example, coils instead of magnets may be used to create the magnetic field desired.

For this exemplary embodiment, the arc created by magnetic device 128 provides a magnetic field extending circumferentially about 180 degrees. In still another embodiment, the arc created by magnetic device 128 provides a magnetic field extending circumferentially in a range of about 170 degrees to about 190 degrees.

A motor 28 (FIG. 2) is in mechanical communication with regenerator 101 and provides for rotation of regenerator housing 102 about axis A-A. By way of example, motor 28 may be connected directly with housing 102 by a shaft or indirectly through a gear box. Other configurations may be used as well.

In the description above, normal MCM was used to describe the operation of heat pump 100. As will be understood by one of skill in the art using the teachings disclosed herein, inverse MCMs could also be used as well. The direction of flow of fluid through heat pump 100 would be reversed, accordingly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A regenerator, comprising:
a plurality of working units extending along a longitudinal direction between a first end of the regenerator and a second end of the regenerator, each working unit comprising a plurality of discrete, elongate elements extending along the longitudinal direction and forming, at locations between the elongate elements, a plurality of flow channels that extend along the longitudinal direction between the elongate elements and are configured for the flow of a heat transfer fluid therethrough, wherein each elongate element is formed from magneto caloric material;
wherein each elongate element is positioned adjacent to, and in contact with, at least one other elongate element in a manner that defines at least one of the plurality of flow channels between the elongate elements.

2. The regenerator of claim 1, wherein the magneto caloric material of the working unit has a Curie temperature that continuously decreases along the longitudinal direction.

3. The regenerator of claim 1, wherein the magneto caloric material of the working unit has a Curie temperature that continuously decreases in a linear manner along the longitudinal direction.

4. The regenerator of claim 1, wherein the magneto caloric material of the working unit comprises a plurality of stages of magneto caloric material with each stage having a different Curie temperature or Curie temperate range than an adjacent stage.

5. The regenerator of claim 1, wherein the magneto caloric material of the working unit comprises a plurality of stages of magneto caloric material with each stage having a different Curie temperature such that the Curie temperatures of the stages decreases along the longitudinal direction.

6. The regenerator of claim 1, wherein the elongate elements have a circular cross-sectional shape, and wherein the cross-sectional shape of the elongate elements and the location of the elongate elements relative to each other defines the cross-sectional shape and of the flow channels.

7. The regenerator of claim 1, wherein the elongate elements have a tubular cross-sectional shape.

8. A heat pump, comprising:
a regenerator defining a circumferential direction along which the regenerator is rotatable, the regenerator extending along longitudinal_direction between a first end and a second end, the regenerator comprising
a plurality of working units arranged adjacent to each along the circumferential direction and extending along the longitudinal direction between the first end of the regenerator and the second end of the regenerator, each working unit comprising a plurality of discrete, elongate elements formed from magneto caloric material and extending along the longitudinal direction, the elongate elements forming a plurality of flow channels between the elongate elements within each working unit, the flow channels extending along the longitudinal direction and configured for the flow of a heat transfer fluid therethrough while in contact with the magneto caloric material; and
a magnetic device positioned proximate to the working units and extending along the longitudinal direction, the magnetic device creating a field of magnetic flux, the magnetic device positioned so that one or more of the plurality of working units are moved in and out of the magnetic field as the working units are rotated along the circumferential direction;
wherein each elongate element is positioned adjacent to, and in contact with, at least one other elongate element in a manner that defines at least one of the plurality of flow channels between the elongate elements.

9. The heat pump of claim 8, wherein the regenerator defines a radial direction and further comprises a cavity positioned radially-inward of the plurality of working units, wherein the magnetic device is positioned within the cavity.

10. The heat pump of claim 9, wherein the magnetic device comprises a plurality of magnets arranged in the shape of an arc and configured to project a magnetic field substantially along a radially-outward direction.

11. The heat pump of claim 8, wherein the magneto caloric material of each working unit has a Curie temperature that continuously decreases along the longitudinal direction.

12. The heat pump of claim 8, wherein the magneto caloric material of each working unit has a Curie temperature that continuously decreases in a linear manner along the longitudinal direction.

13. The heat pump of claim 8, wherein the magneto caloric material of each working unit comprises a plurality of stages of magneto caloric material with each stage having a different Curie temperature or Curie temperate range than an adjacent stage.

14. The heat pump of claim 8, wherein the magneto caloric material of each working unit comprises a plurality of stages of magneto caloric material with each stage having a different Curie temperature such that the Curie temperatures of the stages decreases along the longitudinal direction.

15. The heat pump of claim 8, wherein the elongate elements have a circular cross-sectional shape.

16. The heat pump of claim 8, wherein the elongate elements have a tubular cross-sectional shape.

17. The heat pump of claim 8, wherein the elongate elements have beveled ends.

18. A refrigerator appliance comprising the heat pump of claim 8.

19. A regenerator, comprising:
a plurality of working units extending along a longitudinal direction between a first end of the regenerator and a second end of the regenerator, each working unit comprising a plurality of discrete, elongate elements extending along the longitudinal direction and forming, at locations between the elongate elements, a plurality of flow channels that extend along the longitudinal direction between the elongate elements and are configured for the flow of a heat transfer fluid therethrough, wherein each elongate element is formed from magneto caloric material; wherein the elongate elements have a circular cross-sectional shape, and wherein the cross-sectional shape of the elongate elements and the location of the elongate elements relative to each other defines the cross-sectional shape and of the flow channels.

* * * * *